Figure 2:
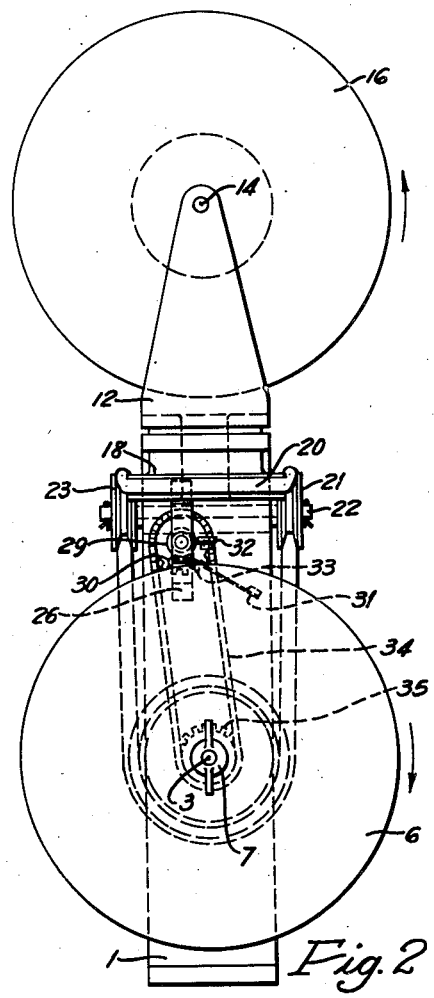

July 8, 1952 R. A. BUB ET AL 2,602,599
PORTABLE CABLE COILER
Filed March 21, 1951

INVENTORS.
ROBERT A. BUB, &
WILLIAM G. YOUNG.
BY
Brown, Critchlow, Flick & Peckham
their ATTORNEYS Patented July 8, 1952

2,602,599

UNITED STATES PATENT OFFICE 2,602,599

PORTABLE CABLE COILER

Robert A. Bub, Penn Township, Allegheny County, and William G. Young, Stoneboro, Pa., assignors to Mine Safety Appliances Company, Pittsburgh, Pa., a corporation of Pennsylvania Application March 21, 1951, Serial No. 216,726

6 Claims. (Cl. 242—54)

This invention relates to apparatus for coiling wire, rope and the like, all referred to herein as cables, and more particularly to such apparatus that is portable and which forms a coil, from the center of which the cable can be pulled without kinking, so that it will lie straight.

Although this cable coiler can be used in many places, it is particularly suitable for mine rescue work, where it is common practice for a rescuer to carry a telephone with him into the mine. To facilitate stringing the telephone cable between the mine fresh air base and the rescuer it is proposed that he carry a dispenser containing a coil of cable. The dispenser is like a box, which has in one side a hole substantially in line with the axis of the coil, and the inner end of the cable is pulled out through this hole and attached to the telephone equipment at the mine entrance. Then, as the rescuer advances, the cable is pulled from the dispenser, unwinding the coil from its inside toward its outside. This manner of stringing the cable helps to prevent it from catching on obstructions, it eliminates any drag weight, and the load lightens (instead of increasing) as the rescuer proceeds. The cable dispensing box is extremely light in comparison with a reel. The cable dispensed from such a box will not lie straight, however, but will kink and knot and tangle unless when it was coiled it was twisted about a full turn for every convolution of the coil. The cable should lie straight in order to further reduce the possibility of its catching on obstructions, and to permit the full length of the cable to be utilized. It also is highly desirable to have a coil which will hold its shape during rough handling and as it is unwound, and in which the various wraps of cable will not become entangled with one another.

In accordance with this invention a cable coiling reel is rotatably supported by a frame which is provided with an opening that has its axis disposed substantially radially of the reel. Journaled in this opening is a hollow shaft, on the outer end of which a reel holder is rigidly mounted. A cable supply reel is rotatably supported by the holder. Means is provided for rotating the coiling reel so as to wind on it a cable which it pulls through the hollow shaft from the supply reel. The coiling reel is operatively connected to the hollow shaft in such a way as to rotate the reel holder as the coiling reel is rotated. Preferably the reel holder is rotated one revolution for each revolution of the coiling reel. This causes the cable to be twisted as it passes from the supply reel to the coiling reel. Also, it is desirable to provide the frame with a spooler or level winder for controlling the positions of the convolutions of the cable on the coiling reel so that each successive layer of convolutions will cross those in the underlying layer. This spooler likewise is operatively connected with the coiling reel, from which it receives its motion. After the cable has been twisted and coiled on the coiling reel, one side of that reel is removed to permit the coil of cable to be slipped off the reel ready for use.

Figure 1:
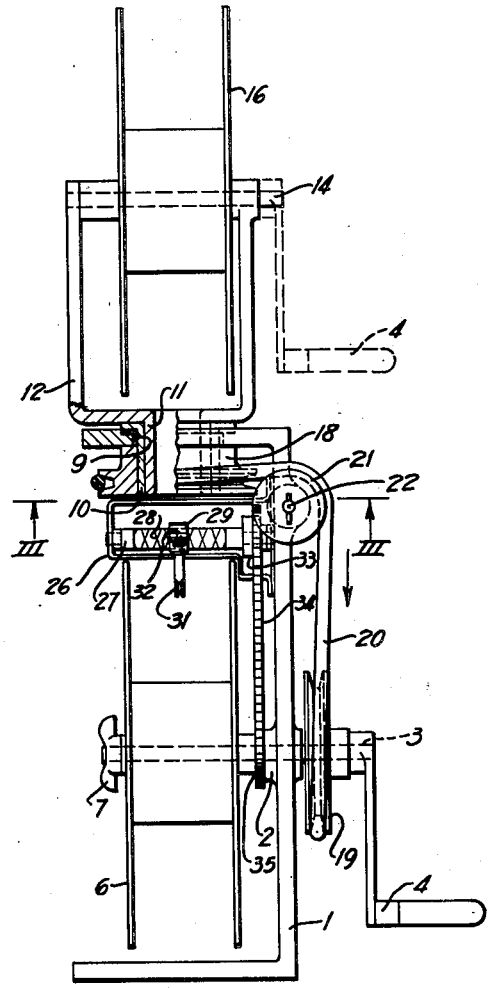
Figure 3:
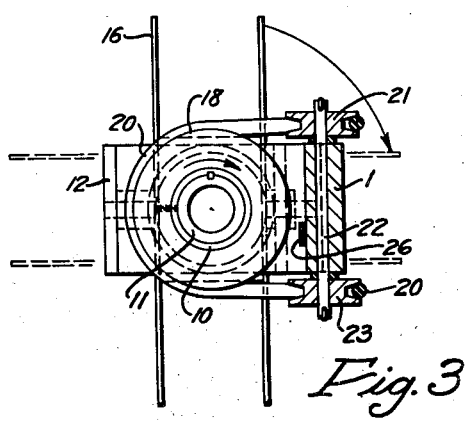

The preferred embodiment of the invention is illustrated in the accompanying drawings, in which Fig. 1 is a plan view of the coiler with a portion of it broken away in section; Fig. 2 is a side view of the coiler; and Fig. 3 is a transverse section taken on the line III—III of Fig. 1.

Referring to the drawings, a generally U-shaped frame 1 has a pair of parallel end walls connected by a side wall. Journaled in a bearing 2 in this side wall is a horizontal shaft 3, on the outer end of which a crank 4 is removably mounted for turning it. The other end of the shaft inside the frame supports a cable reel 6 which is rotated by the shaft. The side of the reel next to the open side of the frame can be removed by unscrewing a wing nut 7 threaded on the projecting end of the shaft.

One end wall of frame 1 is provided with an opening 9, the axis of which is substantially radial to the reel. Journaled in this opening is a sleeve bearing 10 which extends toward reel 6. This bearing is keyed on a short hollow shaft 11 which it encircles. The outer end of the shaft supports the inner end of a yoke 12. Journaled in the outer end of the yoke is a shaft 14, one end of which projects from the yoke and is formed for reception of crank 4 when it is desired to turn the shaft. A cable supply reel 16 is rigidly mounted on the shaft inside the yoke. The axis of the shaft preferably lies in a plane parallel to the axis of the first reel 6.

Rigidly mounted on the projecting inner end of bearing 10 is a pulley 18, while another pulley 19 of the same size is rigidly mounted on shaft 3 between the crank and the frame. An endless belt 20 extends from pulley 19 along the outside of the frame toward the yoke 12 to a point opposite the other pulley 18. At that point the belt passes ninety degrees around a small horizontal pulley 21 pivotally mounted on one end of a vertical pin 22 that extends through the side of the frame. From this small pulley the belt passes around pulley 18 on the hollow shaft and then back around another small horizontal pulley 23 (Fig. 3) pivotally mounted on pin 22 below the frame. From this last pulley the belt extends back along the side of the frame and around pulley 19. Consequently, when the coiling reel crank is turned, the belt and pulley drive rotates the yoke 12 on an axis at right angles to the axis of the coiling reel. Since pulleys 18 and 19 have the same diameter, the yoke is rotated one revolution for every revolution of the coiling reel. As the coiling reel is rotated, a cable that previously had been wound on the supply reel and passed through the hollow shaft is wound on the coiling reel. Every revolution of the yoke twists the cable 360°.

To prevent the various convolutions of the cable in the coil on the coiling reel 6 from becoming tangled with one another, the coiling is controlled in such a way that each successive layer of wraps crosses the underlying layer. This control of the coiling is effected by a conventional level winder or spooler. The spooler includes a bracket 26 extending from the side of the frame across the frame between the coiling reel and the yoke pulley 18. A small shaft 27 is journaled in the opposite ends of this bracket. This shaft is provided with crossed helical grooves 28 which cause a sleeve 29 that is mounted on the shaft and registers with the grooves in a well-known manner to travel back and forth along the shaft as the shaft rotates. The sleeve is prevented from rotating with the shaft by means of a U-shaped slide 30 attached to it and straddling one side of the bracket, along which it slides. The sleeve also supports the outer end of a resilient guide arm 31, the inner end of which is bent into U-shape to slidably receive the cable as it is pulled from one reel to the other. The length of cable between hollow shaft 11 and the guide arm passes through a guide bushing 32 carried by sleeve 29. The spooler shaft is rotated by a sprocket 33 on it that is driven by a chain 34 from a sprocket 35 mounted on shaft 3 between the adjoining reel and the frame. Thus, when the coiling reel is rotated, it rotates the spooler shaft and thereby causes the guide arm to move back and forth across the reel and thereby lay the cable on the reel at predetermined angles to its axis. The angle of grooves 28 in the spooler shaft is such as to cause the guide arm to travel rather fast across the reel in relation to the speed of rotation of the reel, so that the different layers of coil convolutions will cross one another at pronounced angles. This will help the coil to hold its shape as it is unwound later, and will prevent the various convolutions from becoming entangled with one another.

In using this apparatus, one end of a cable (not shown) is attached to supply reel 16 in any suitable manner and then that reel is rotated by crank 4 (which has been removed from shaft 3 and applied to shaft 14 for that purpose) to wind the cable on it. The outer end of the coiled cable then is passed through hollow shaft 11 and the inner end 32 of the guide arm and is held in any suitable manner against coiling reel 6. This reel then is rotated in a clockwise direction by crank 4 to pull the cable through the hollow shaft from the supply reel and simultaneously wind it on the coiling reel. At this time the two reels rotate in the directions indicated by the arrows in Fig. 2. As the coiling reel is rotated, the spooler is actuated by it through the chain and sprocket drive, and the yoke 12 is rotated in the end of the frame by means of the belt and pulley drive in the direction of the arrow shown in Fig. 3. As previously explained, rotation of the yoke twists the cable as it is supplied to the coiling reel. After all of the cable has been wound on the coiling reel, wing nut 7 is removed so that the adjoining side of the reel also can be removed, whereupon the coil is pulled axially off the hub of the reel. The coil then can be placed in a dispenser having a center hole in its top, and the inner end of the coiled cable can be pulled out of the hole. Due to the twist that was put in the cable as it was coiled, the cable will lay straight as it is pulled from the dispenser.

Although this cable coiler can be used for producing the telephone cable coils to be sold for rescue work and the like, it is especially suitable for rewinding such cables at rescue centers after the original cable coils have been uncoiled in practice rescue drills.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A cable coiler comprising a frame, a cable coiling reel rotatably supported by the frame, the frame being provided with an opening having its axis disposed substantially radially of the reel, a hollow shaft journaled in said opening, a reel holder rigidly mounted on the outer end of the shaft, a cable supply reel rotatably supported by said holder, means for rotating the coiling reel to wind thereon a cable that it pulls through the hollow shaft from the supply reel, and means operatively connecting the coiling reel to the hollow shaft to rotate said reel holder as the coiling reel is rotated, whereby to twist the cable as it passes from the supply reel to the coiling reel.

2. A cable coiler comprising a frame, a cable coiling reel rotatably supported by the frame, the frame being provided with an opening having its axis disposed substantially radially of the reel, a hollow shaft journaled in said opening, a reel holder rigidly mounted on the outer end of the shaft, a cable supply reel rotatably supported by said holder with its axis in a plane substantially parallel to the axis of said coiling reel, means for rotating the coiling reel to wind thereon a cable that it pulls through the hollow shaft from the supply reel, and means operatively connecting the coiling reel to the hollow shaft to rotate said reel holder as the coiling reel is rotated, whereby to twist the cable as it passes from the supply reel to the coiling reel, one side of the coiling reel being removable so that a cable coil on that reel can be removed axially therefrom.

3. A cable coiler comprising a frame, a cable coiling reel rotatably supported by the frame, the frame being provided with an opening having its axis disposed substantially radially of the reel, a hollow shaft journaled in said opening, a reel holder rigidly mounted on the outer end of the shaft, a cable supply reel rotatably supported by said holder with its axis in a plane substantially parallel to the axis of said coiling reel, means for rotating the supply reel on its axis to wind a cable thereon, means for rotating the coiling reel to wind thereon said cable that it pulls through the hollow shaft from the supply reel, and means operatively connecting the coiling reel to the hollow shaft to rotate said reel holder as the coiling reel is rotated, whereby to twist the cable as it passes from the supply reel to the coiling reel.

4. A cable coiler comprising a frame, a cable coiling reel rotatably supported by the frame, the frame being provided with an opening having its axis disposed substantially radially of the reel, a hollow shaft journaled in said opening, a reel holder rigidly mounted on the outer end of the shaft, a cable supply reel rotatably supported by said holder, means for rotating the coiling reel to wind thereon a cable that it pulls through the hollow shaft from the supply reel, a spooler for controlling the coiling of the cable on the coiling reel and including a rotatable actuating member, means operatively connecting the coiling reel to said actuating member to rotate that member as the coiling reel is rotated, and means operatively connecting the coiling reel to the hollow shaft to rotate said reel holder, whereby to twist the cable as it passes from the supply reel to the coiling reel.

5. A cable coiler comprising a frame, a cable coiling reel rotatably supported by the frame, the frame being provided with an opening having its axis disposed substantially radially of the reel, a hollow shaft journaled in said opening, a reel holder rigidly mounted on the outer end of the shaft, a cable supply reel rotatably supported by said holder, means for rotating the coiling reel to wind thereon a cable that it pulls through the hollow shaft from the supply reel, a pulley rigidly connected to the hollow shaft, a pulley rotatable with the coiling reel, a pair of parallel intermediate pulleys between the other two pulleys and mounted on the frame on an axis perpendicular to the axes of said other two pulleys, and an endless belt extending around said reel pulley and one of said intermediate pulleys and then around said shaft pulley and back around the other intermediate pulley to the reel pulley.

6. A cable coiler comprising a frame having an open side, a cable coiling reel disposed in the frame and rotatably mounted in the side of the frame opposite to its open side, one end of the frame being provided with an opening having its axis disposed substantially radially of the reel, a hollow shaft journaled in said opening, a yoke rigidly mounted on the outer end of the shaft, a cable supply reel rotatably mounted in the yoke, a crank for turning the supply reel to wind a cable thereon, a crank for rotating the coiling reel to wind thereon said cable that it pulls through the hollow shaft from the supply reel, and a belt and pulley drive operatively connecting the coiling reel with said shaft to rotate the yoke as the last-mentioned crank is turned, whereby to twist the cable as it passes from the supply reel to the coiling reel, and one side of the coiling reel being removable so that a cable coil on that reel can be removed axially therefrom.

ROBERT A. BUB.
WILLIAM G. YOUNG.

REFERENCES CITED

The following references are of record in the file of this patent:

UNITED STATES PATENTS

| Number | Name | Date |
| --- | --- | --- |
| 296,190 | Lasar | Apr. 1, 1884 |
| 1,230,009 | Merfield et al. | June 12, 1917 |
| 1,541,683 | Buehler | June 9, 1925 |